(12) United States Patent
Ludewig et al.

(10) Patent No.: US 9,168,833 B2
(45) Date of Patent: Oct. 27, 2015

(54) DISPLAY INSTRUMENT HAVING A POINTER

(76) Inventors: Bernd Ludewig, Weinheim (DE); Jean-Yves Daurelle, Paris (FR)

( * ) Notice: Subject to any disclaimer, the term of this patent is extended or adjusted under 35 U.S.C. 154(b) by 777 days.

(21) Appl. No.: 13/502,730

(22) PCT Filed: Oct. 13, 2010

(86) PCT No.: PCT/EP2010/065351
§ 371 (c)(1),
(2), (4) Date: Jun. 29, 2012

(87) PCT Pub. No.: WO2011/047996
PCT Pub. Date: Apr. 28, 2011

(65) Prior Publication Data
US 2012/0264102 A1    Oct. 18, 2012

(30) Foreign Application Priority Data

Oct. 24, 2009  (DE) .......................... 10 2009 050 580
Aug. 24, 2010  (DE) .......................... 10 2010 035 240

(51) Int. Cl.
| | |
|---|---|
| G09B 25/00 | (2006.01) |
| B60K 37/02 | (2006.01) |
| G01D 11/28 | (2006.01) |
| G01D 13/26 | (2006.01) |
| G01P 1/08 | (2006.01) |

(52) U.S. Cl.
CPC ............... *B60K 37/02* (2013.01); *G01D 11/28* (2013.01); *G01D 13/265* (2013.01); *G01P 1/08* (2013.01); *B60K 2350/203* (2013.01); *B60K 2350/408* (2013.01); *G09B 25/00* (2013.01)

(58) Field of Classification Search
CPC ...... G09B 25/00; G01D 11/28; G01D 13/265; B60K 2350/203; B60K 2350/408; B60K 37/02; G01P 1/08
USPC ........................................... 116/284; 434/365
See application file for complete search history.

(56) References Cited

U.S. PATENT DOCUMENTS

| | | | | |
|---|---|---|---|---|
| 6,601,532 B1 * | 8/2003 | Olbrich | .......................... | 116/288 |
| 6,981,464 B2 * | 1/2006 | Birman et al. | ................. | 116/288 |
| 7,159,534 B2 * | 1/2007 | Tanaka et al. | ................. | 116/300 |
| 7,591,562 B2 * | 9/2009 | Birman et al. | ................... | 362/23 |
| 7,629,874 B2 * | 12/2009 | Araki et al. | ................ | 340/425.5 |
| 7,681,517 B2 * | 3/2010 | Ritthaler et al. | .............. | 116/288 |
| 7,743,726 B2 * | 6/2010 | Yoshida | ........................ | 116/287 |

(Continued)

FOREIGN PATENT DOCUMENTS

| | | |
|---|---|---|
| CN | 1637393 A | 7/2005 |
| DE | 102006026871 A1 | 12/2007 |

(Continued)

OTHER PUBLICATIONS

Chinese Office Action dated Mar. 10, 2014.
(Continued)

*Primary Examiner* — R. A. Smith
*Assistant Examiner* — Tania Courson
(74) *Attorney, Agent, or Firm* — Fletcher Yoder, P.C.

(57) ABSTRACT

An indicating instrument has a pointer rotatable about a pointer axle. A coupling part, a pointer vane and at least one pointer section are arranged between the pointer and the axle. Between the pointer coupling part and the pointer vane at least one pointer section is held in a base structure.

16 Claims, 2 Drawing Sheets

(56) References Cited

U.S. PATENT DOCUMENTS

Figure 1:
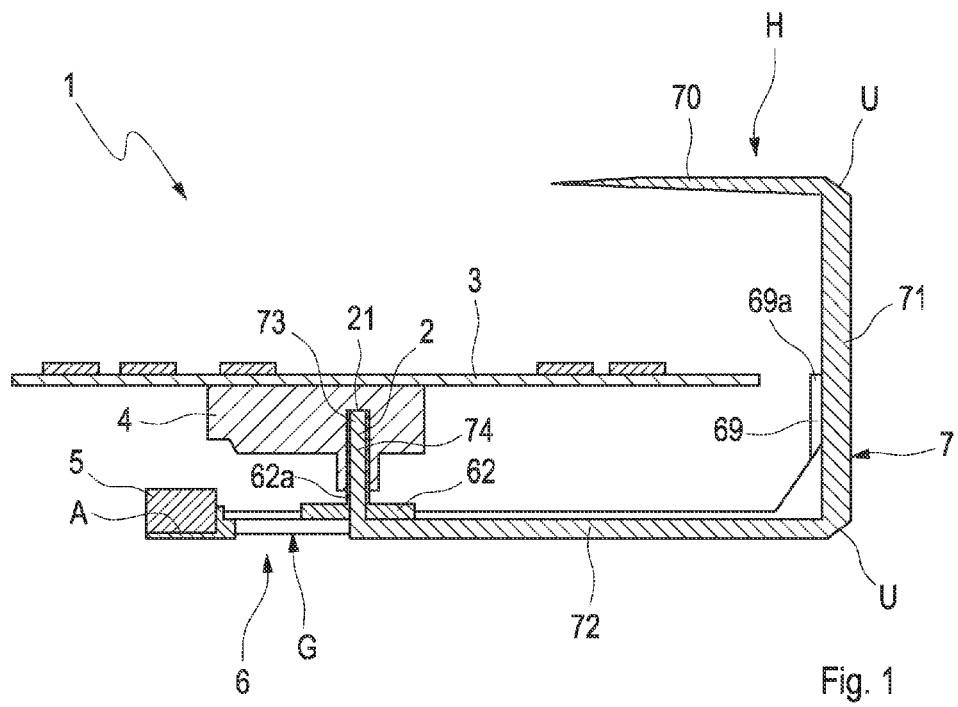

| | | | |
|---|---|---|---|
| 8,120,506 B2 * | 2/2012 | Ono | 340/815.78 |
| 8,166,907 B2 * | 5/2012 | Engel et al. | 116/297 |
| 8,347,807 B2 * | 1/2013 | Sigg et al. | 116/288 |
| 8,506,102 B2 * | 8/2013 | Ono et al. | 362/23.09 |
| 8,562,159 B2 * | 10/2013 | Manivannan et al. | 362/23.21 |

FOREIGN PATENT DOCUMENTS

| | | | |
|---|---|---|---|
| EP | 2048479 A | 4/2009 | |
| EP | 2048479 A1 | 4/2009 | |
| WO | 1702437 A | 11/2005 | |
| WO | 2007009523 A1 | 1/2007 | |
| WO | 2009084043 A2 | 7/2009 | |
| WO | 2457071 A | 8/2009 | |

OTHER PUBLICATIONS

International Search Report for application No. PCT/EP2010/006312 mailed Jan. 24, 2011.

German Office Action dated Apr. 1, 2015.

* cited by examiner

DISPLAY INSTRUMENT HAVING A POINTER

CROSS REFERENCE TO RELATED APPLICATIONS

This application claims priority from and the benefit of PCT Application No. PCT/EP2010/065351, filed on Oct. 13, 2010; German Patent No. DE 10 2009 050 580.6, filed on Oct. 24, 2009; and German Patent DE 10 2010 035 240.3, filed on Aug. 24, 2010; all entitled "Display Instrument Having a Pointer", which are herein incorporated by reference.

BACKGROUND

The invention relates to an indicating instrument with a pointer, in particular for a motor vehicle.

Indicating instruments, which have a pointer rotatably mounted in front of a scale for a measurement variable to be displayed and on the basis of the angular position of which the current value of the respective measurement variable is displayed, are sufficiently well known from motor-vehicle technology.

In order to be able to use a central region of the indicating instrument for further display functions without interfering effects of the pointer, the use of hook pointers is known; the latter are mounted on the side of the indicating instrument facing away from the observer. Such hook pointers reach around a contour of the indicating instrument with a hook-shaped tip, which comprises the pointer vane that can be seen by the observer. Said pointer vane points to the place on the scale which corresponds to the current value of the measurement variable to be displayed.

SUMMARY

The object of the invention is to specify an improved indicating instrument that makes it possible to use the central region of the indicating instrument.

According to the invention, the object is achieved by the features specified in claim 1.

Advantageous developments of the invention are the subject matter of the dependent claims.

In the case of an indicating instrument according to the invention with a pointer that is rotatably arranged about a pointer axle and has a pointer coupling part, more particularly a pointer hub, and a pointer vane and at least one pointer sections arranged therebetween, at least one of the pointer sections is held in a base structure between the pointer coupling part and the pointer vane.

As a result of such a hold, formed by means of the base structure, of one of the pointer sections of the pointer, there is a particularly high stiffness and strength of the pointer. By arranging the base structure on one of the pointer sections, the base structure is not visible to the observer of the indicating instrument, and so the latter can easily be read without impediments to vision.

An advantageous development of the invention provides for the pointer to be embodied as an optical waveguide, wherein at least the region of the pointer close to the coupling is held by the base structure in a bearing manner. This enables a precise and stable hold and alignment of the pointer, even in the case of a pointer embodied as an optical waveguide, which generally does not have sufficiently high stability.

A development of the invention provides for the pointer section adjoining the pointer coupling part to be held in the base structure. This enables particularly good strength in the central region of the indicating instrument, as a result of which the indicating instrument is embodied for holding an optical output unit, more particularly a screen unit, e.g. an LCD, TFT or OLED unit, in the center thereof.

In one possible embodiment, the base structure is formed as a base frame, which stiffens the at least one pointer section on both sides along the longitudinal extent thereof. Such a frame-shaped base structure has high strength while having a low weight.

The base frame is expediently formed by a kite. Here, the base frame is formed by two adjacent side pairs with, in each case, sides of equal length, wherein the diagonals of the quadrilateral are perpendicular to one another and one of the diagonals forms an axis of symmetry that halves the other diagonal. Alternatively, the base frame can have a rhombus-shaped design, i.e. it can be embodied as a rhombus with four sides of equal length, wherein both diagonals are axes of symmetry. Such a quadrilateral and open frame structure has a simple design and is easy to produce and has a low weight while having high strength.

The longitudinal axis of the at least one pointer section forms an axis of symmetry of the base frame for a particularly stable embodiment of the pointer. If the base frame is embodied as a kite, the longitudinal axis of the pointer section forms the axis of symmetry of the kite. If the base frame is embodied as a rhombus, the longitudinal axis of the pointer section forms one of the two axes of symmetry.

The sides of the base frame are preferably respectively embodied as an open profile, more particularly as an L-, T- or I-shaped profile. This constitutes a further option for reducing the weight.

According to an advantageous development of the invention, a transverse web runs along the diagonal of the base frame that runs perpendicular to the pointer section. This transverse web connects the side pairs of the base frame and brings about a further increase in stability and strength.

A further embodiment provides for the pointer coupling part to be arranged penetrating the transverse web and projecting perpendicularly therefrom. As a result of this, the pointer coupling part is held in a particularly stable manner, and so further components of the indicating instrument can be arranged thereon. In particular, a stepper motor for actuating the pointer and a printed-circuit board arranged on the stepper motor, and also a screen unit, can be arranged on the pointer coupling part, which is arranged centrally.

In a particularly simple embodiment, a plug-in sleeve is formed perpendicularly onto the transverse web and the pointer coupling part can be plugged therein.

Depending on the embodiment of the indicating instrument, the pointer coupling part, or the pointer coupling part together with the plug-in sleeve, can be plugged into a connector part of a stepper motor or can be plugged onto a drive shaft of a stepper motor. This constitutes a particularly simple and secure coupling of the pointer to the drive, embodied as stepper motor, for moving the pointer.

In a first embodiment, in the viewing direction, the stepper motor is arranged in front of the base structure, wherein, in the viewing direction, a printed-circuit board is arranged in front of the stepper motor. In other words, the stepper motor is attached to the printed-circuit board on the side facing away from the component side thereof. This constitutes a very compact design of the indicating instrument by virtue of the stepper motor and also the printed-circuit board and, with the latter, optionally also a display or another illumination unit being arranged in the free space formed between the pointer sections and the pointer vane.

In an alternative embodiment, the stepper motor is arranged behind the base structure in the viewing direction, wherein a printed-circuit board is arranged behind the stepper motor in the viewing direction. In other words, the stepper motor is attached to the component side of the printed-circuit board. This constitutes an optimal design of the indicating instrument with a pointer.

DRAWINGS

In the following text, embodiments of the invention that should merely be considered to be exemplary are described with reference to the attached drawings.

Figure 2:
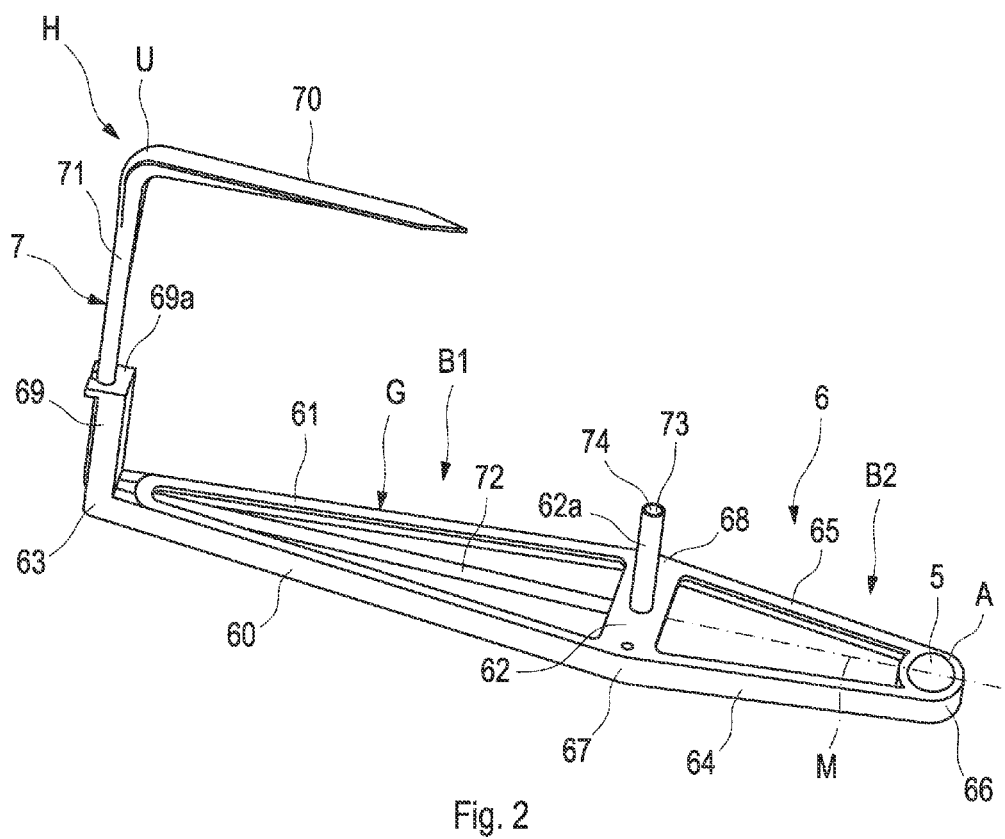
Figure 3:
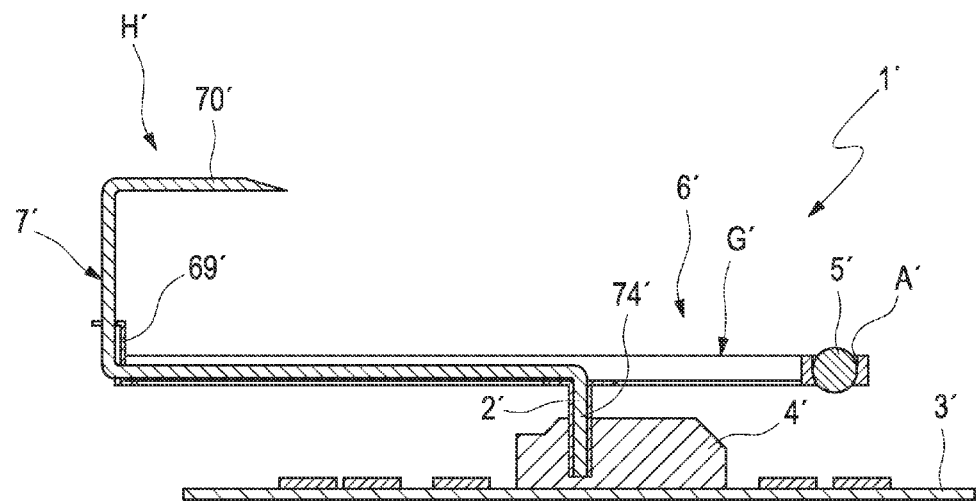
Figure 4:
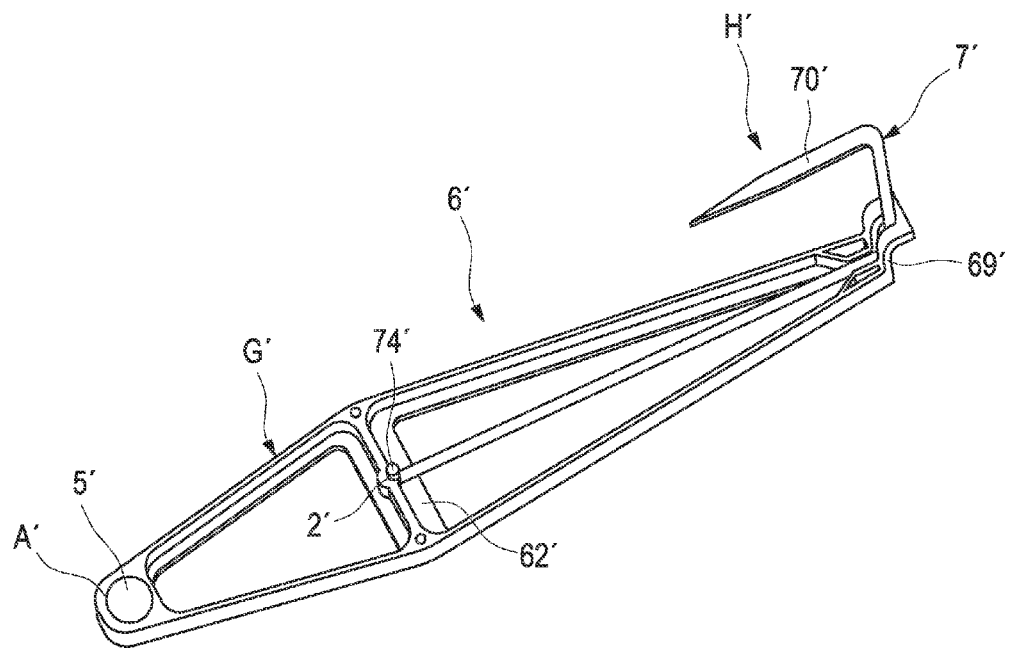

FIG. 1 schematically shows the basic design of a first exemplary embodiment of an indicating instrument according to the invention with a hook pointer, in a first design variant, in a lateral view;

FIG. 2 shows the hook pointer, in a first design variant, in a perspective, schematic individual illustration;

FIG. 3 schematically shows the basic design of a second exemplary embodiment of an indicating instrument according to the invention with a hook pointer, in a second design variant, in a lateral view; and FIG. 4 shows the hook pointer, in a first design variant, in a perspective, schematic individual illustration.

DETAILED DESCRIPTION

FIG. 1 schematically shows, in a lateral view, the basic design of a first exemplary embodiment of an indicating instrument 1 according to the invention with a pointer embodied as a hook pointer H, in a first design variant.

The hook pointer H has a pointer vane 70 and a pointer coupling part 74, which is embodied as pointer hub and can be coupled to a drive for turning the hook pointer H. Between the pointer vane 70 and the pointer coupling part 74, the hook pointer H comprises pointer sections 71 and 72, which are arranged with respect to one another in a bent manner, more particularly bent at an angle of 90° with respect to one another. As a result of such two-time bending of the hook pointer H while forming the pointer sections 71 and 72, the pointer section 72 runs substantially parallel to the pointer vane 70 while forming a free space, the width of which corresponds to the length of the pointer section 71. The pointer coupling part 74 is likewise bent by 90° with respect to the adjoining pointer section 72 and runs substantially parallel to the pointer section 71. Here, the pointer coupling part 74 forms a free end section 73 of the hook pointer H.

This free end section 73, and hence the pointer coupling part 74, can be plugged into or onto a drive for actuating the hook pointer H.

A stepper motor 4, provided on the rear side of a printed-circuit board 3, actuates the hook pointer H, in a first design variant, via the pointer coupling part 74, which, in this case, is embodied as pointer axle 2.

By way of example, the pointer coupling part 74 can be plugged into an appropriate connector part of the stepper motor 4 or enclose a drive shaft of the stepper motor 4.

From its end face 21 facing the printed-circuit board 3, the pointer axle 2, about which the hook pointer H, in a first design variant, is rotatably mounted, extends out into space from the printed-circuit board 3. The pointer axle 2 is arranged approximately perpendicular to the plane of the printed-circuit board 3.

A counterweight 5 that serves to minimize the pointer imbalance is embedded into a receptacle section A of a base structure 6 (not visible in FIG. 1), which is illustrated in FIG. 2. With a region with an approximately u-shaped cross section, the hook pointer H, in a first design variant, engages around the superposed edges of printed-circuit board 3 and an instrument scale (not illustrated) or an optical output unit, e.g. an LCD, TFT or OLED unit.

The pointer vane 70 extends inward, in a bent manner, in a radial direction with respect to the pointer axle 2, i.e. toward the geometric longitudinal axis of the pointer axle 2, at an angle of approximately 90° from the pointer section 71, forming an intermediate section, of an angled part 7 which is described in more detail in FIG. 2.

FIG. 2 shows the hook pointer H, in a first design variant, in a perspective, schematic individual illustration. The hook pointer H, in a first design variant, comprises the base structure 6, which is embodied in a lightweight manner, i.e. not solid throughout, in order to reduce the inertia of the hook pointer H.

At least the pointer section 72 between the pointer coupling part 74 and the pointer vane 70 is held in the base structure 6 in order to ensure sufficient strength and stiffness of the hook pointer H. The pointer section 72 is the pointer section adjoining the pointer coupling part 74. As a result of such additional stiffening of the hook pointer H in the vicinity of the pointer coupling part 74, and hence in the vicinity of the pointer hub, the indicating instrument 1 can hold an optical indicator, such as a display, in the center, in addition to the printed-circuit board 3.

For the purposes of a particularly simple and light construction of the base structure 6, the latter is embodied as a base frame G, which stiffens the at least one pointer section 72 on both sides along the longitudinal extent thereof.

In the illustrated embodiment, the base frame G is formed by a kite, wherein the longitudinal axis of the pointer section 72 forms the axis of symmetry (center line M) of the kite, and hence of the base frame G. As an alternative, and not illustrated in any more detail, the base frame G can also be embodied as a rhombus.

The base frame G moreover has a transverse web 62, which extends along the diagonal of the base frame G that runs perpendicular to the pointer section 72. The pointer coupling part 74 is arranged penetrating the transverse web 62 and projecting perpendicularly therefrom with the free end section 73.

In order to stiffen the pointer coupling part 74, a plug-in sleeve 62a, into which the pointer coupling part 74 can be plugged, is formed perpendicularly onto the transverse web 62, and hence onto the base frame G.

The sides of the base frame G are preferably respectively embodied as an open profile. In the exemplary embodiment, the sides are embodied with an L-shaped profile; compared to a closed profile, this constitutes a particularly light and, at the same time, sufficiently solid embodiment. Alternatively, the sides can be embodied with a T-shaped or I-shaped profile.

In detail, the base structure 6 has a mirror-symmetric design with respect to the center line M running perpendicular to the pointer axle 2 and comprises a first basis section B1, which consists of two elongate first limbs 60, 61 (=a first pair of sides of, in particular, equal length). The first limbs 60, 61 extend away from the transverse web 62, and butt against one another with their outer ends while forming a first tip 63, which points in a first direction.

The base structure 6 comprises a second basis section B2, which consists of two elongate second limbs 64, 65 (a second pair of sides of, in particular, equal length). The second limbs 64, 65, which are shorter than the first limbs 60, 61, extend away from the transverse web 62 and, in turn, butt against one another with their free ends while forming a second tip 66, which points in a second direction, which is opposite to the first direction.

The first limbs 60, 61 meet in pairs with the second limbs 64, 65 in two mutually opposing corner regions 67, 68, and so the second limbs 64, 65 together with the first limbs 60, 61 form the quadrilateral, more particularly kite-shaped, base frame G.

In an embodiment that has not been illustrated, the base frame G can also have a rhombus-shaped design, with all limbs 60, 61, 64, 65 having the same length.

The pointer axle 2 and the plug-in sleeve 62a are attached to the transverse web 62, the longitudinal axis of which is arranged perpendicular to the center line M. The pointer axle 2 and the plug-in sleeve 62a extend upward into space from the transverse web 62. The transverse web 62 interconnects the two corner regions 67, 68 of the base frame G. The plug-in sleeve 62a can have an integral design with the base frame G, or be formed onto the latter.

The receptacle section A is formed in the region of the second tip 66, with the e.g. spherical counterweight 5 being embedded in said receptacle section A, said counterweight being mounted such that it can pivot with the hook pointer H and rotate about the pointer axle 2. By way of example, the counterweight 5 is wholly or partly made of metal, for instance steel, while the base structure 6 is, for example, made wholly or partly of plastic.

The base structure 6 furthermore comprises a holding section 69, which is, for example, connected integrally to the base frame G, attached to the first tip 63 and extends away from the first tip 63 in the direction that is parallel to the pointer axle 2.

The pointer vane 70, which tapers toward its free end, is embodied as bent first end section of the angled part 7. The angled part 7 furthermore has the basic section extending from the transverse web 62 to the first tip 63 along the center line M as pointer section 72, which merges into the intermediate section as pointer section 71 bent by approximately 90°, to the end of which pointer section 71 the pointer vane 70 is attached.

By way of example, the pointer section 72 embodied as basic section can be designed and integrated into the base structure 6 such that it satisfies the function of a structural strengthening of the base frame G.

A fork-shaped holding extension 69a, formed onto the holding section 69, engages around the pointer section 71, embodied as intermediate section, in a clamping manner.

In addition to the pointer vane 70, the angled part 7, which, in particular, has an integral design, comprises the pointer section 71 that forms an intermediate section and the pointer section 72 that forms a basic section, and also a second end section 73, which forms the pointer coupling part 74 and runs inside the plug-in sleeve 62a, along the pointer axle 2 and coaxially with the latter.

So that the indicating instrument 1 can also be read in the dark, the angled part 7, and hence the pointer H, can, wholly or in sections, be made out of a light-conducting material, into which light is coupled at a suitable point and routed through the hook pointer H, in a first design variant. In order to decouple the light at a desired point, it is possible for decoupling means that are suitable for this to be provided on the angled part 7.

In order to route the coupled light from the coupling point to the pointer vane 70, the pointer H, i.e. the angled part 7, has deflection areas U, on which the light can be deflected by reflection up to the pointer vane 70 and hence the pointer tip.

The base structure 6 is used to hold, in a bearing manner, and support the pointer H, embodied as an optical waveguide, at least in the region near the coupling, i.e. in the region where the pointer H is coupled to the stepper motor 4. Here, at least the pointer coupling part 74, the pointer section 72 and, at least in part, the pointer section 71 are held by the base structure 6 in a bearing manner and supported thereon.

It is also feasible to provide the angled part 7 with light-conducting means, for instance films, in order thus to fulfill the above-described illumination purpose.

FIGS. 3 and 4 show a further exemplary embodiment of the invention, wherein the same components are provided with the same reference signs, possibly characterized by the addition of a small line, as in the first exemplary embodiment.

FIG. 3 shows a lateral view of the basic design of the second exemplary embodiment of an indicating instrument 1' according to the invention with a hook pointer H', held in a base frame G', with a pointer vane 70', in a second design variant, wherein the base frame G' has a receptacle section A' with an embedded counterweight 5' in order to minimize the pointer imbalance.

Structural differences between the embodiment variant in FIGS. 1 and 2 and the one in FIGS. 3 and 4 firstly emerge from the different positioning of the stepper motors 4, 4' with respect to the printed-circuit board 3, 3'. While the stepper motor 4 is arranged on the rear side of the printed-circuit board 3 in the first exemplary embodiment, the stepper motor 4' is arranged on the front side of the printed-circuit board 3' in the second exemplary embodiment. The stepper motor 4' provided on the front side of the printed-circuit board 3' actuates the hook pointer H', in a second design variant, via the pointer axle 2' and the pointer coupling part 74'.

FIG. 4 shows the hook pointer H', in a second design variant, in a perspective, schematic individual illustration. The hook pointer H', in a second design variant, again comprises a base structure 6' with a kite-shaped (alternatively a rhombus-shaped) base frame G' and an angled part 7' and merely differs from the hook pointer H, in a first variant, in terms of a different relative arrangement between the pointer axle 2' and the base structure 6'.

Whereas in the hook pointer H, in a first variant, the pointer axle 2 and the holding section 69 extend away from the plane defined by the base frame G in the same direction, in the hook pointer H', in a second variant, the pointer axle 2' (not visible in FIG. 4) and the holding section 69' extend away from one another in opposite directions from the plane defined by the base frame G'.

In conclusion, important aspects of the invention can also be worded as: producing pointer instruments with hook pointers, the drive of which is assembled on the rear side of a printed-circuit board and the axle of which points away from the printed-circuit board (so that the requirement of boring through the printed-circuit board is dispensed with). Here, the pointer is provided with a framework structure in order to reduce the inertia and a counterweight to remove the imbalance.

LIST OF REFERENCE SYMBOLS

1 First exemplary embodiment of an indicating instrument
1' Second exemplary embodiment of an indicating instrument
2, 2' Pointer axle
3, 3; Printed-circuit board
4,4' Stepper motor
5, 5' Counterweight
6, 6' Base structure
7, 7' Angled part
21 End face (of the pointer axle)
60, 61 First limbs
62 Transverse web 62a Plug-in sleeve
63 First tip
64,65 Second limbs
66 Second tip
67, 68 Corner regions
69, 69' Holding section
69a Holding extension
70, 70' Pointer vane
71 Pointer section (intermediate section)
72 Pointer section (basic section)
73 End section
74, 74' Pointer coupling part
A Receptacle section
B1 First basis section
B2 Second basis section
G, G' Base frame
H Hook pointer, in a first design variant
H' Hook pointer, in a second design variant
M Center line
U Deflection areas

The invention claimed is:

1. An indicating instrument, comprising:
a pointer rotatably arranged about a pointer axle, wherein the pointer comprises a pointer coupling part, a pointer vane, and a first pointer section, the first pointer section is arranged between the pointer vane and the pointer coupling part, and the first pointer section is offset from the pointer vane along a viewing direction; and
a base structure configured to stiffen the first pointer section, wherein the base structure comprises at least one limb extending along a longitudinal extent of the first pointer section, and at least a portion of the at least one limb is laterally offset from the first pointer section such that a gap is formed between the at least one limb and the first pointer section.

2. The indicating instrument as claimed in claim 1, wherein the pointer comprises an optical waveguide.

3. The indicating instrument as claimed in claim 1, wherein a longitudinal axis of the first pointer section forms an axis of symmetry of the base structure.

4. The indicating instrument as claimed in claim 1, wherein the pointer coupling part is configured to be plugged into a connector part of a stepper motor, or the pointer coupling part is configured to engage a drive shaft of the stepper motor.

5. The indicating instrument as claimed in claim 4, wherein in the viewing direction, the stepper motor is arranged in front of the base structure, and wherein, in the viewing direction, a printed-circuit board is arranged in front of the stepper motor.

6. The indicating instrument as claimed in claim 4, wherein in the viewing direction, the stepper motor is arranged behind the base structure, and wherein, in the viewing direction, a printed-circuit board is arranged behind the stepper motor.

7. The indicating instrument as claimed in claim 1, wherein the first pointer section is directly coupled to the pointer coupling part.

8. The indicating instrument as claimed in claim 1, wherein the at least one limb comprises a first limb positioned on a first lateral side of the first pointer section and a second limb positioned on a second lateral side of the first pointer section, opposite the first lateral side.

9. The indicating instrument as claimed in claim 8, wherein the base structure comprises a transverse web extending between the first limb and the second limb.

10. The indicating instrument as claimed in claim 9, wherein the pointer coupling part penetrates the transverse web and projects perpendicularly from the transverse web.

11. The indicating instrument as claimed in claim 9, wherein the first limb extends from a first lateral end of the transverse web to a first tip, the second limb extends from a second lateral end of the transverse web, opposite the first lateral end, to the first tip, and the first and second limbs intersect one another at the first tip.

12. The indicating instrument as claimed in claim 11, wherein the base structure comprises a third limb and a fourth limb, the third limb extends from the first lateral end of the transverse web to a second tip, the fourth limb extends from the second lateral end of the transverse web to the second tip, the third and fourth limbs intersect one another at the second tip, and the second tip is positioned on an opposite longitudinal end of the base structure from the first tip.

13. The indicating instrument as claimed in claim 12, wherein the base structure comprises a receptacle positioned at the second tip, and the receptacle is configured to receive a counterweight.

14. The indicating instrument as claimed in claim 1, wherein the pointer comprises a second pointer section extending between the first pointer section and the pointer vane, and the second pointer section is angled relative to the first pointer section and to the pointer vane.

15. The indicating instrument as claimed in claim 14, wherein the second pointer section is angled about 90 degrees relative to the first pointer section and about 90 degrees relative to the pointer vane.

16. The indicating instrument as claimed in claim 14, wherein the base structure is configured to support the second pointer section via a holding section.

* * * * *